United States Patent [19]

Tanaka et al.

[11] 4,310,416
[45] Jan. 12, 1982

[54] PLATE TYPE FLUID TREATMENT APPARATUS

[75] Inventors: Yoshinobu Tanaka; Koichi Ogawa; Minoru Hioka, all of Kurashiki, Japan

[73] Assignee: Kuraray Company, Limited, Kurashiki, Japan

[21] Appl. No.: 168,809

[22] Filed: Jul. 11, 1980

Related U.S. Application Data

[63] Continuation of Ser. No. 935,001, Aug. 18, 1978, abandoned.

[30] Foreign Application Priority Data

Aug. 19, 1977 [JP] Japan .................................. 52-99830
Apr. 26, 1978 [JP] Japan .................................. 53-50805
May 22, 1978 [JP] Japan .................................. 53-69619

[51] Int. Cl.³ ............................................. B01D 13/00
[52] U.S. Cl. ........................... 210/321.3; 210/433.2; 210/500 Z; 128/214 R
[58] Field of Search ................ 210/321, 433.2, 500 Z, 210/634, 637; 128/214 R

[56] References Cited

U.S. PATENT DOCUMENTS 3,608,729 9/1971 Haselden ..................... 210/500 Z X
3,720,321 3/1973 Coughlin ......................... 210/500 Z
3,907,687 9/1975 Hoeltzenbein .................... 210/321.3
4,051,041 9/1977 Riede ............................... 210/321.3
4,110,220 8/1978 Lavender ..................... 210/321.3 X

*Primary Examiner*—S. Leon Bashore
*Assistant Examiner*—Ferris H. Lander
*Attorney, Agent, or Firm*—Oblon, Fisher, Spivak, McClelland & Maier

[57] ABSTRACT

A small-sized plate type fluid treatment apparatus for filtration and separation of fluid, transferring substances between fluids through membranes or passing specific substances contained in the fluid through membranes. Said apparatus consists of a plurality of stacked membrane arrangements which comprises membrane support-plates, each being molded in thickness of 1.2 mm or less by means of embossing or press work, and a single membrane interposed between said membrane support-plates. The membrane support-plate composing the membrane arrangements of this apparatus is so designed that the 1st fluid is fed into the space defined by the 1st membrane support-plate and the membrane, and the 2nd fluid is fed into the space defined by the 2nd membrane support-plate and the foresaid membrane, with no abruptly narrowed passage for fluid. Therefore, even when as thin a membrane support-plate as 1.2 mm or less in thickness is used, residence of bubbles is prevented in the fluid in the performance of the apparatus.

9 Claims, 33 Drawing Figures

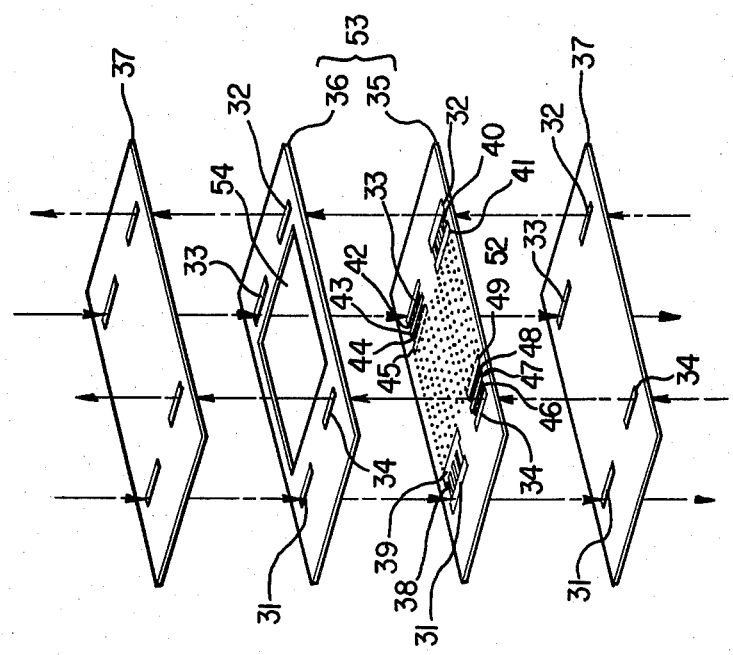
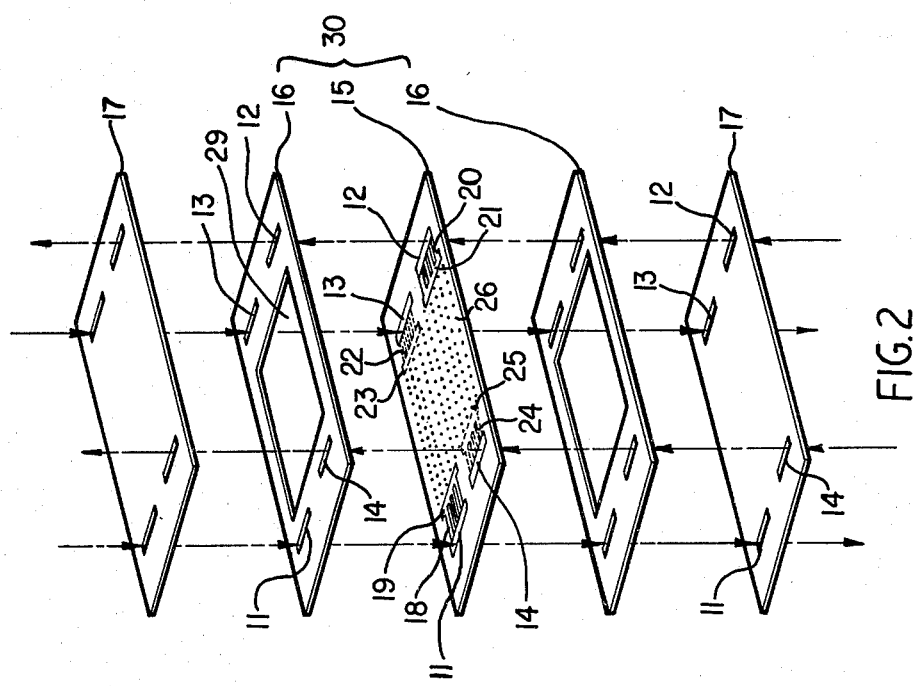

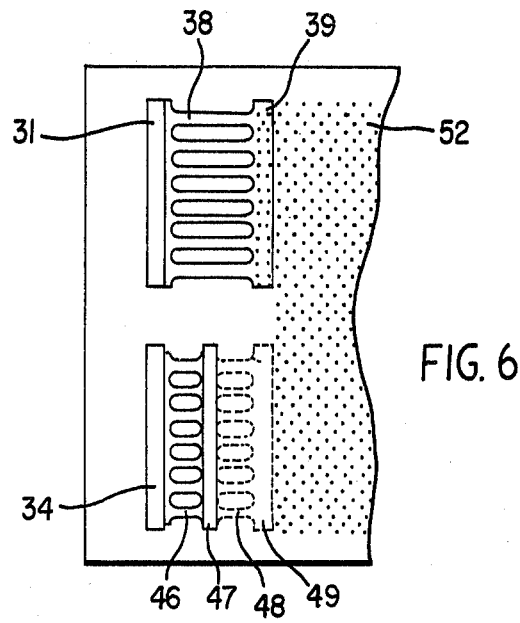
FIG. 6
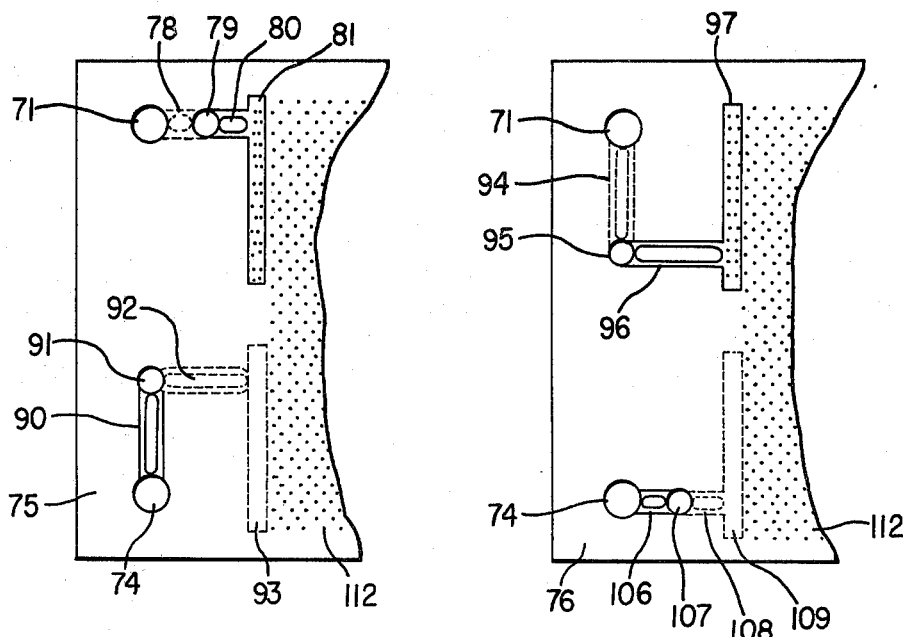
FIG. 10(a)
FIG. 10(b)

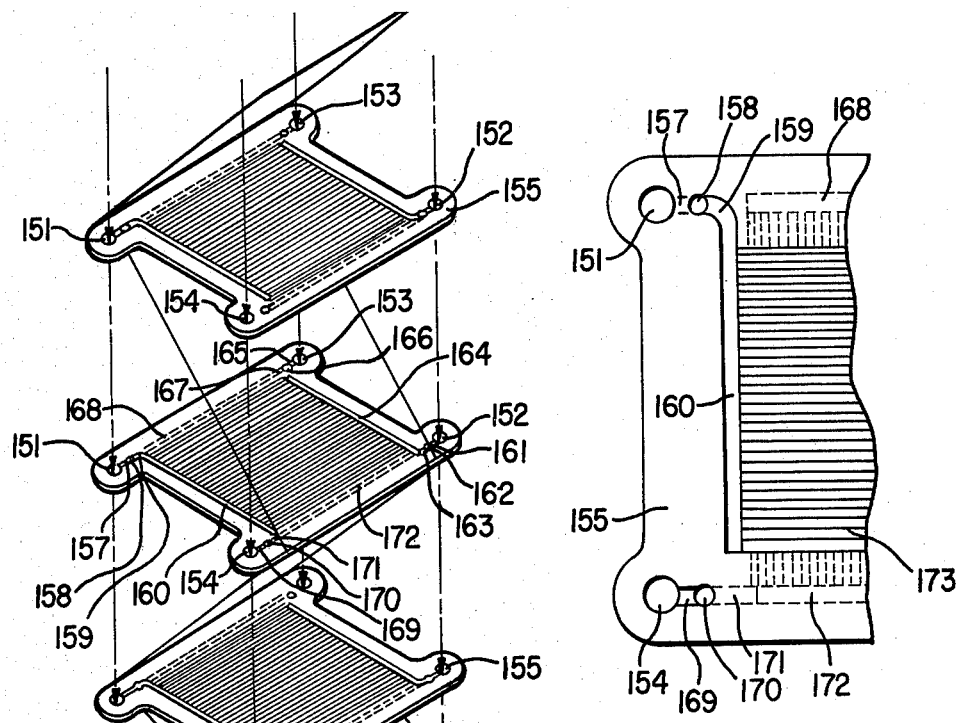
FIG. 15
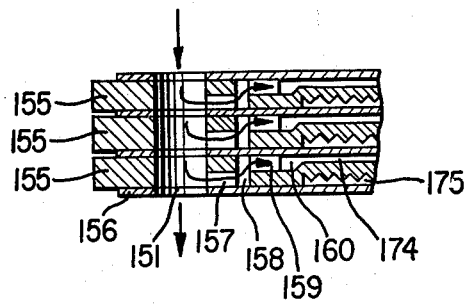
FIG. 16
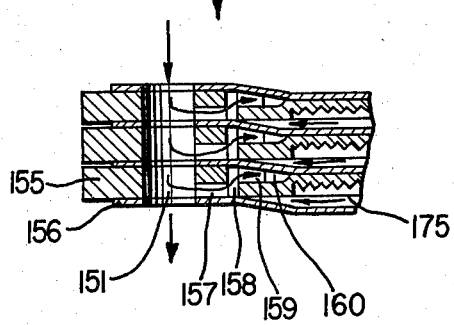
FIG. 18
FIG. 17

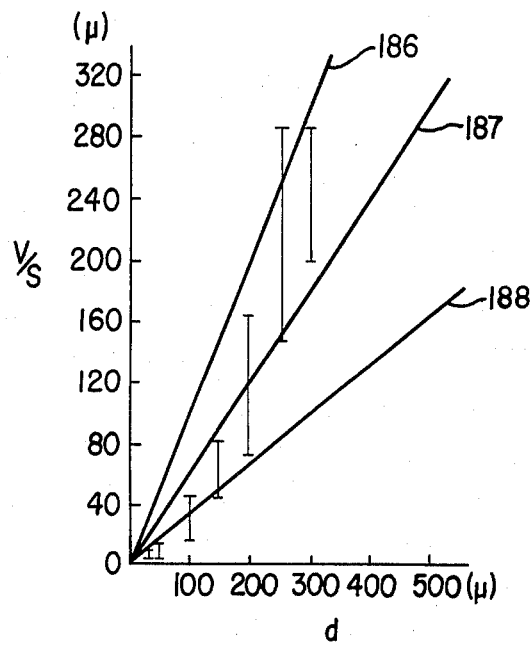
FIG. 20
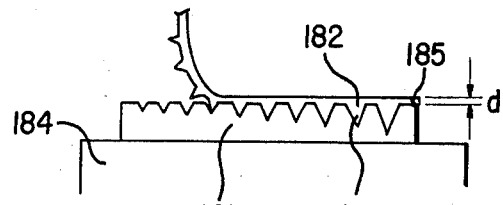
FIG. 19
FIG. 21
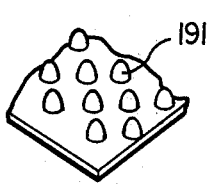
FIG. 22
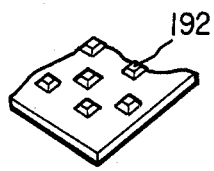
FIG. 23
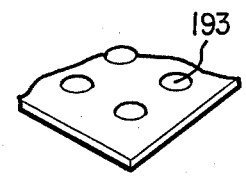
FIG. 24

PLATE TYPE FLUID TREATMENT APPARATUS

This is a continuation of application Ser. No. 935,001, filed Aug. 18, 1978, and now abandoned.

BACKGROUND OF THE INVENTION

1. Field of the Invention

This invention relates to a small-sized fluid treatment apparatus for filtration and separation of fluid, transferring substances between fluids through membranes or passing specific substance contained in the fluid through membranes. Said apparatus consists of a plurality of stacked membrane arrangements which comprise membrane support-plates, each being molded in thickness of 1.2 mm or less by means of embossing or press work, and a single membrane interposed between said membrane support-plates. The membrane support-plate composing the membrane arrangement of this apparatus is designed such that the 1st fluid is fed into the space defined by the 1st membrane support-plate and the membrane, and the 2nd fluid is fed into the space defined by the 2nd membrane support-plate and foresaid membrane, with no abruptly narrowed passage for fluid.

2. Description of Prior Art

Fluid treatment apparatus employing membranes are in wide use for various purposes. For example, for industrial use there are the condensing, purifying apparatus, ion exchangers, etc., artificial kidneys, artificial lungs, ascitic treatment apparatus, etc. for medical use, and purification of test pieces, bio-reactors, etc. for analytical use. Particularly, the artificial kidney has been the one attracting public attention in recent years.

Among various ways of use of a membrane, a sheet membrane is used for a comparatively large surface area of a unit construction such as sheet film in the case of the so-called Kiil dialyzer. The apparatus according to this invention is then designed to be adapted preferably for the artificial kidney. Accordingly, the invention will be described hereunder by way of examples of artificial kidneys. However, it will become apparent that the application of the present invention extends to other apparatus for filtration and separation of fluid.

The Kiil dialyzer is an apparatus used for blood purification where dialysate and blood are introduced into channels formed by a plurality of flat membranes and a plurality of stacked membrane support-plates, transferring effete matters, poisonous matters, and water from blood to dialysate through the membranes utilizing diffusion resulting from a concentration gradient and ultrafiltration from the pressure gradient between the blood and dialysate.

As compared with the coil and the hollow fiber dialyzer, the Kiil dialyzer is appreciated and used as a safe and excellent apparatus having the following advantages:

(1) Due to a small resistance to blood flow, little damage is caused to blood cells.

(2) Blood loss is small as remaining blood after use is small.

(3) Because the priming volume of the Kiil dialyzer is essentially small, blood taken out of the body of a patient is small, thus causing no disorders in a patient's body such as anemia.

A typically known conventional Kiil dialyzer such as disclosed by U.S. Pat. No. 3,837,496 comprises a plurality of stacked membrane support-plates, a plurality of paired membranes interposed between said membrane support-plates, and blood ports having radial blood distributing grooves between paired membranes. Dialysate flows in the space formed by the membrane support-plate and the membrane, while blood introduced through blood ports flows between a pair of membranes. In another type of Kiil dialyzer as disclosed by U.S. Pat. No. 3,585,131, the membrane support-plates are inserted into the pleat on one side of the folded membrane to make up a passage of dialysate, while the other support-plates alternatively form a blood passage into the pleat on the other side. However, in most of these known conventional artificial kidneys, the membrane support-plates are usually manufactured by sophisticated injection molding in order to achieve the smooth but complicated blood passage which is necessary to avoid damage to blood. The thickness of the membrane support-plate thus obtained naturally falls in the range of from 1.2 mm to 5.0 mm when a complicated configuration of fluid passage, and economized speed for injection molding, are taken into consideration. As a result, the Kiil dialyzer which employs layers of such injection molded support-plates has such drawbacks as being bulky, heavy and difficult in handling in the hospital. In addition, a large amount of used resin, which is the material of the support-plates, may cause disposal problems after their use, as in the case of incineration. On the other hand, construction of the former artificial kidney requires exact positioning of a blood port between a pair of membranes and of membranes on the support-plate for stacking. Such an operation is extremely difficult to automate, which means inadaptability to mass production system. As regards the artificial kidney described secondly, it may permit automated stacking of the membranes and the support-plates because of no need of providing blood ports but it requires support-plates instead in order to form a blood passage. It therefore has disadvantages of being bulky, almost twice as large as that of the one described first and of a large amount of resin consumption. So, the known conventional Kiil dialyzers may tend to be bulkier and more expensive than the coil and hollow fiber dialyzers. However, since the Kiil dialyzer is safe and exhibits excellent performance, a new type of Kiil dialyzer is desired which is comparable to and even superior to coil and hollow fiber dialyzer in compactness, weight and cost.

The present inventors thoroughly examined the mechanism, design, construction and assembly of the known Kiil dialyzer in an attempt to achieve the foresaid requirements. We have found:

(1) that in order to exhibit the excellent performance of a Kiil dialyzer, dialysate and blood must flow through channels properly formed on the support-plate without uneven flow, chanelling and/or by-passing, etc. For this purpose, support-plates must not be eliminated.

(2) that, although mesh is used as a membrane-support for a coil dialyzer, it is not recommended in case of Kiil dialzyer. Our investigation reveals that the mesh easily captures bubbles, which leads to blood coagulation and loss as well as causing uneven flow, probably due to the woven pattern.

(3) that in the Kiil dialyzer having blood ports, positioning blood ports between a pair of membranes may prevent automated process of manufacture and therefore is a limit in making it compact, light and inexpensive. It is, then, necessary to eliminate blood ports between a pair of membranes. Support-plates instead should be employed so as not only to give blood passage but also to enable stacking process automated for mass production.

(4) that in order to employ a support-plate instead of a blood port and furthermore to make an assembly compact and inexpensive at the same time, it is important to reduce the thickness of each support-plate. Reduction of the apparatus in size and of the cost, then, depends upon the thickness of support-plate. We need to seek a better support molding method to achieve this because, with the conventional injection molding, it is difficult to obtain a support-plate less than 1.2 mm in thickness with economized speed for mass production.

(5) that molding of a support-plate by embossing or press work on a thermoplastic film may permit the thickness to be reduced to less than 1.2 mm and at the same time a lower cost.

However, a conventional injection molding technique is not suited for molding support-plates of thickness less than 1.2 mm in an economical production speed because of the difficulty in molding the complicated fluid channels. Therefore, in order to fulfil the requirements, it is necessary to adapt another molding method. By our further study, we have found that embossing and press work may permit accurate molding of thinner support-plates. Moreover, embossing a support-pattern on a relatively inexpensive thermoplastic film can be made at fairly high speed, which enables the cost reduction of a support-plate and consequently the cost reduction of a dialyzer. With this embossing technique, we attempted a manufacture of the support-plate having the same design as disclosed in U.S. Pat. No. 3,585,131, but of 1.0 mm in thickness. We observed that the support-plate thus obtained caused uniform flow of blood and dialysate and abnormal pressure increase, which resulted in poor performance of the dialyzer. The bubbles captured in the fluid passage are considered to be responsible for the poor performance. It is, then, found virtually unpractical to reduce the plate thickness simply without a change in the design of the fluid channels and the membrane supporting pattern as employed in the U.S. Pat. No. 3,585,131. From our experimental study, we have found that there were less bubbles trapped in the fluid passage for a support-plate thicker than 1.2 mm. As it becomes thin, e.g. less than 1.2 mm, bubble trapping started and then dialyzing performance began to decrease. Remarkable decrease in the performance was seen when the thickness was less than 0.8 mm.

Trapping of bubbles in the fluid channels resulting from the reduction of the plate-thickness may be construed as follows:

The bubble resists deformation from its spherical shape by the surface tension of the ambient fluid. The smaller the bubble is, and the larger the degree of deformation is, the larger the resistance becomes. Therefore, the thinner the support-plate is, the smaller the bubble becomes and the larger the resistance to deformation becomes. In the membrane support-plate of a conventional Kiil dialyzer construction, a bubble can not be removed unless it is divided into two or more parts, or even deformed so as to be halved at least in the direction of the thickness of the support-plate. In the case of such abrupt, so to speak, intermittent deformation a bubble, however, the smaller the bubble is, the greater the resistance thereof becomes. Accordingly, when there is a portion where the fluid passage is abruptly narrowed as in the simple reduction of the thickness of support-plate of the conventional Kiil dialyzer, it is extremely difficult to discharge bubbles smoothly, thereby allowing for retaining of bubbles in the course of the fluid flow.

Based upon the above consideration and experimental results, we have achieved the design of a dialyzer according to the present invention. The detailed construction of its constituting members will be described hereinafter.

SUMMARY OF THE INVENTION

The objects of this invention are:

(1) to provide a membrane support-plate in such a construction as to prevent bubbles from being retained in the fluid passage even when the thickness thereof is 1.2 mm or less.

(2) to provide a fluid treatment apparatus wherein the dimensions thereof can be made comparatively small by the use of the above said membrane support-plates.

(3) to provide a fluid treatment apparatus using comparatively inexpensive membrane support-plates made from thermoplastic film and molded by embossing or press work.

(4) to provide an inexpensive fluid treatment apparatus which is simple in construction, economical in manufacture, and may be produced in an automation system.

(5) to provide a membrane support-plate which gives uniform flow of fluid and minimizes pressure loss of fluid even when the thickness of the membrane support-plate is 1.2 mm or less.

(6) to provide a fluid treatment apparatus wherein the membrane arrangements comprising the membrane and the membrane support-plate are inserted between paired clamping plates and are compressed to be secured thereto with relative ease.

BREIF DESCRIPTION OF THE DRAWING

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 2 is a perspective view illustrating the construction of the membrane support-plate comprising the 1st member and the paired 2nd member arranged on both sides of said 1st member;

Figure 4A:
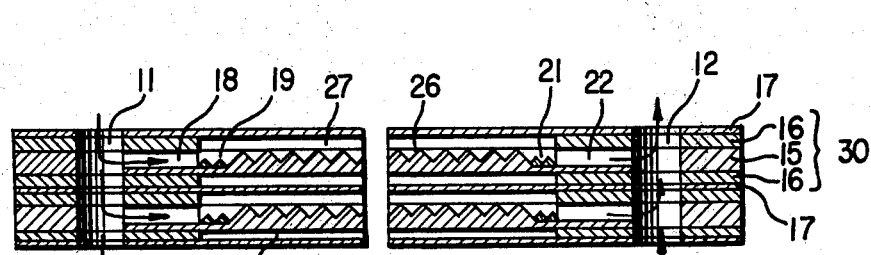
Figure 4B:
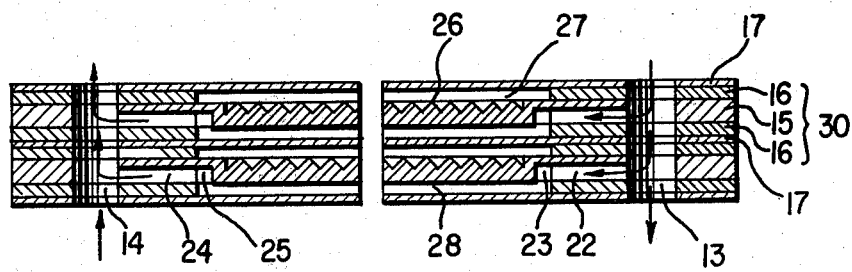
Figure 7A:
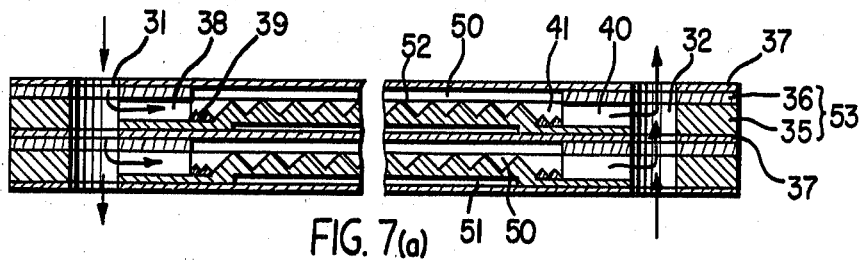
Figure 7B:
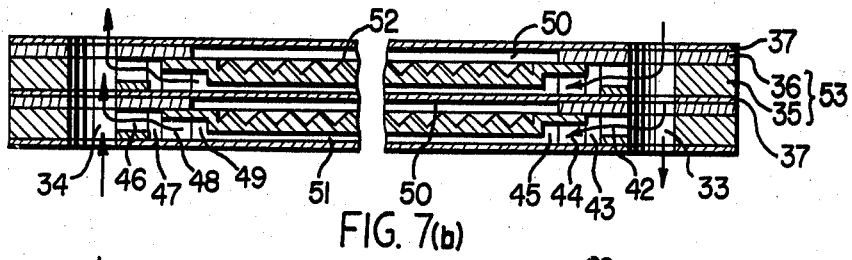
Figure 8A:
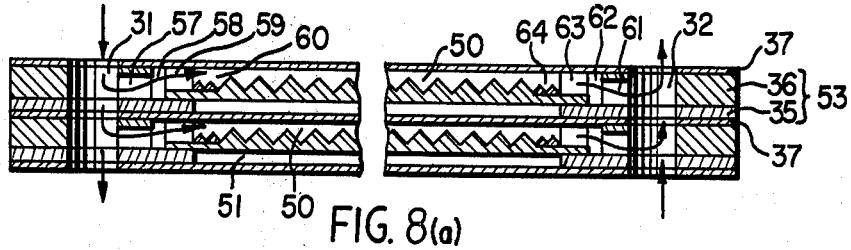
Figure 8B:
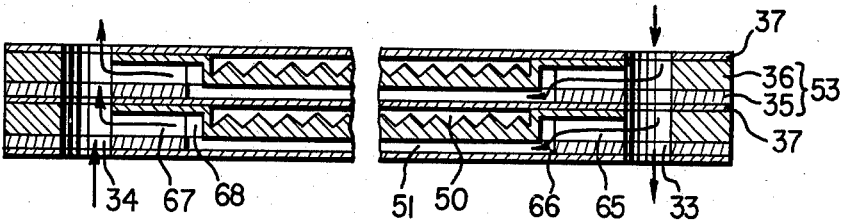
Figure 9:
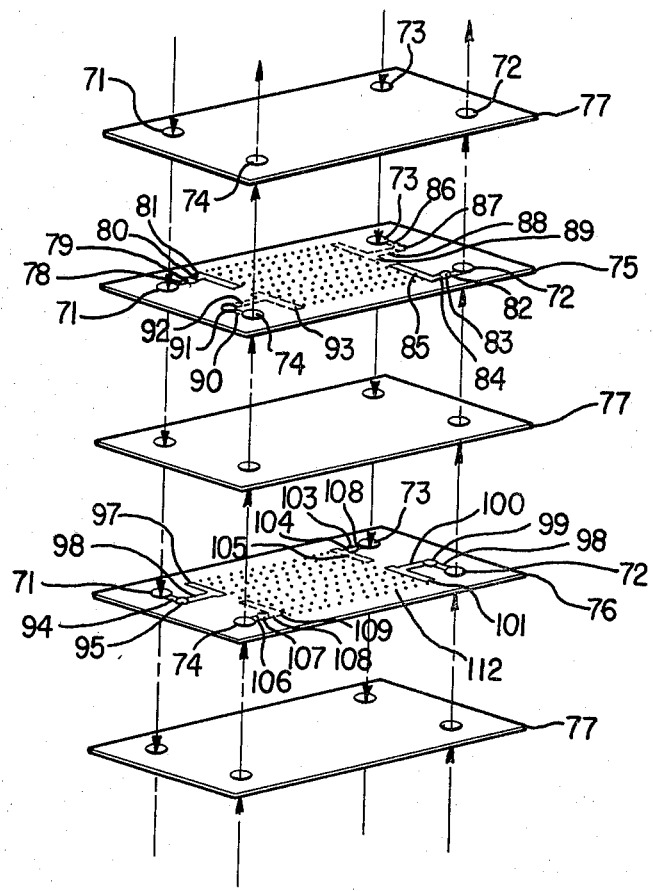
Figure 11A:
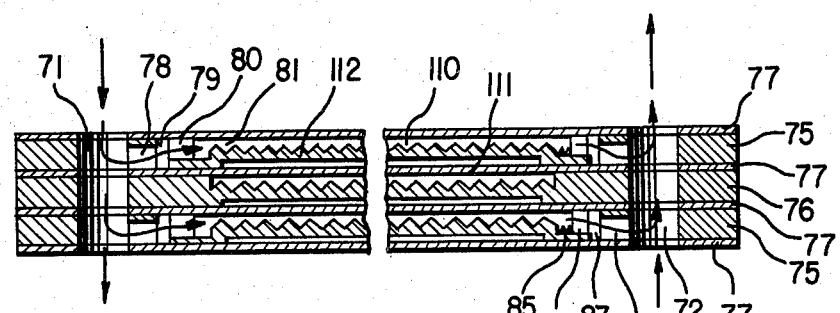
Figure 11B:
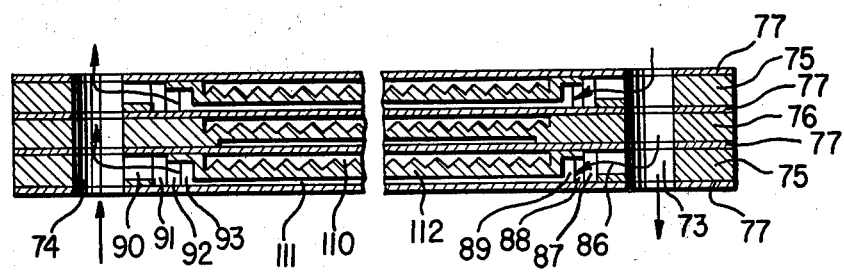
Figure 12:
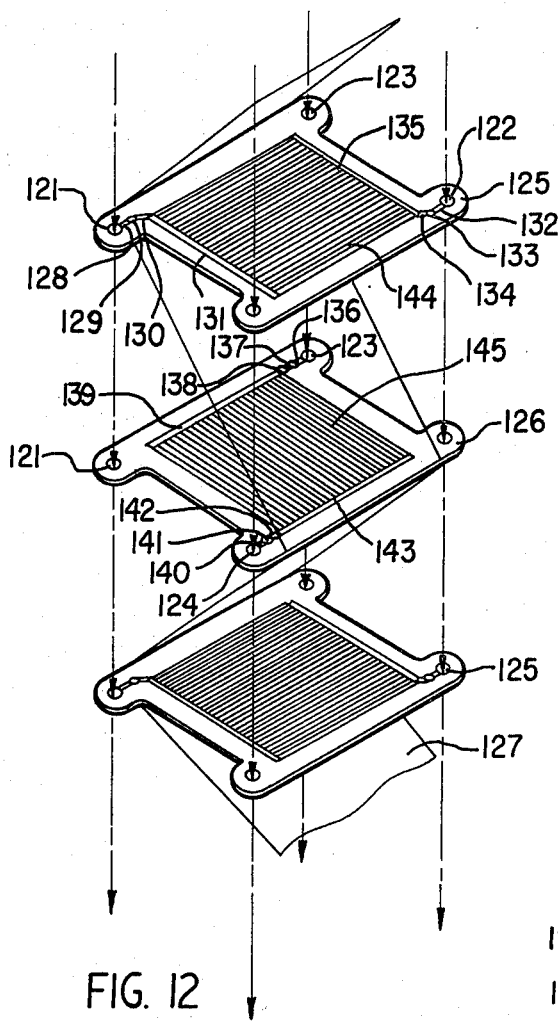
Figure 13:
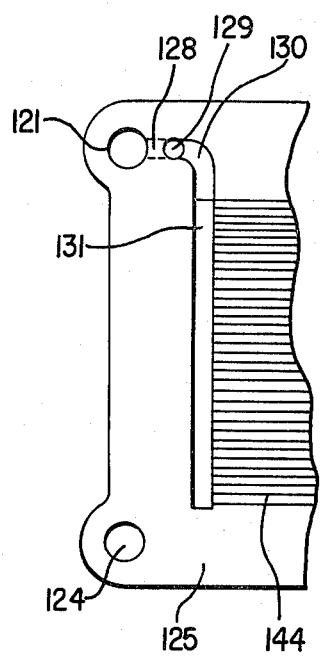
Figure 14:
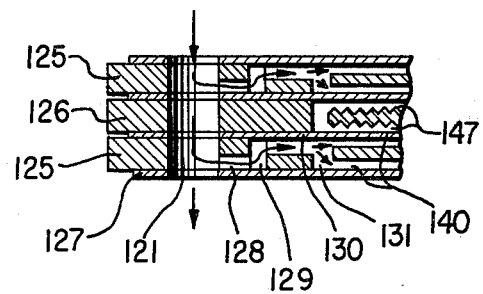
Figure 25:
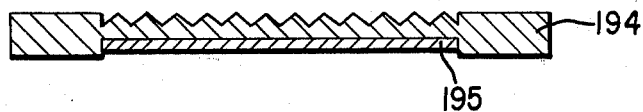
Figure 26:
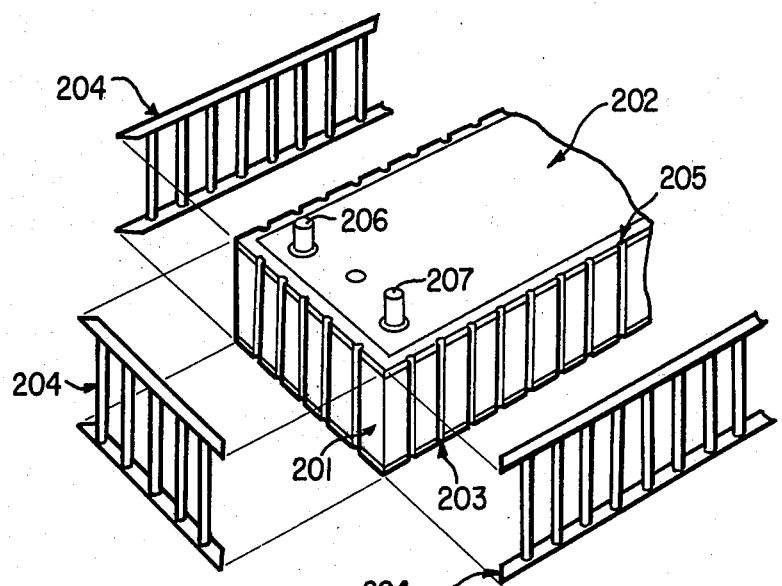
Figure 27:
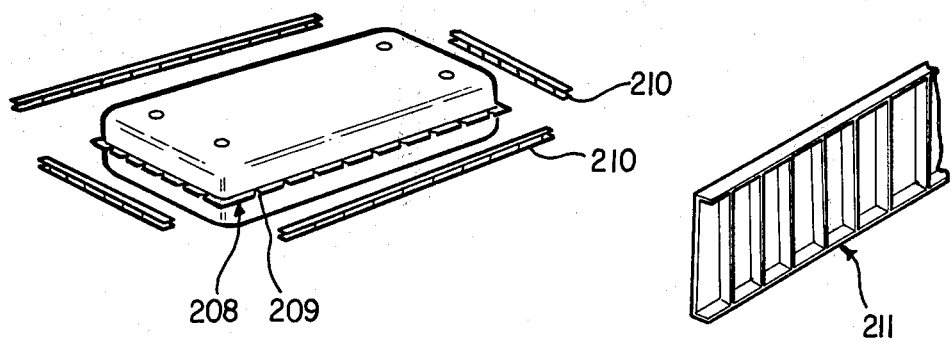
Figure 28:
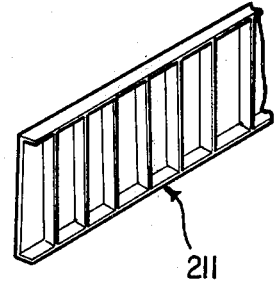

FIG. 4(a) and FIG. 4(b) are sectional views showing the 1st and 2nd fluid passages in FIG. 2, respectively;

FIG. 5 is a perspective view illustrating the construction of the membrane support-plate comprsing the 1st and 2nd members disposed on the 1st surface of said 1st member;

FIG. 6 is an enlarged plan view showing the 1st member shown in FIG. 5;

FIG. 7(a) and FIG. 7(b) are sectional views showing the 1st and 2nd fluid passage shown in FIG. 5, respectively;

FIG. 8(a) and FIG. 8(b) are sectional views showing the fluid passage when the 2nd member is disposed on the 2nd surface of the 1st member in FIG. 5, (a) shows the 1st fluid passage, (b) shows the 2nd one;

FIG. 9 is a perspective view illustrating the construction wherein the membrane is disposed between the 1st and the 2nd membrane support-plates;

FIG. 10 is an enlarged plan showing the 1st membrane support-plates shown in FIG. 9;

FIGS. 11(a) and 11(b) are sectional views showing the 1st and 2nd fluid passages shown in FIG. 9, respectively;

FIG. 12 is a perspective view of the construction of the support-plates and the membrane as disclosed in U.S. Pat. No. 3,585,131, wherein the 1st membrane support-plates are disposed in the pleat on one side of the folded membrane and the 2nd membrane support-plates in the pleats on the other side;

FIG. 13 is an enlarged plan view of the 1st membrane support-plate shown in FIG. 12;

FIG. 14 is a sectional view showing the 1st fluid passages shown in FIG. 12;

FIG. 15 is a perspective view of the construction wherein the membrane support-plate as disclosed in FIG. 7 of the specification of U.S. Pat. No. 3,585,131 are disposed in the pleats on both sides of the folded membrane;

FIG. 16 is an enlarged plan view of the membrane support-plate shown in FIG. 15;

FIG. 17 is a sectional view showing the 1st fluid passage shown in FIG. 15;

FIG. 18 is a view illustrating where the 1st and 2nd fluids mingle together in the fluid passage shown in FIG. 17;

FIG. 19 is a drawing of a test method to examine an appropriate thickness of the membrane support-plate to be molded by embossing or press work;

FIG. 20 is a graph showing test results obtained by the test shown in FIG. 19;

FIGS. 21 through 24 are perspective views showing appropriate shapes of projections to be employed for the membrane support-plate of this invention;

FIG. 25 is a drawing showing an example wherein adsorbent is fixed over the 2nd membrane supporting region of the membrane support-plate;

FIG. 26 is a perspective view illustrating frame pieces for assemblage which compress and secure the membrane arrangements inserted between paired clamping plates and comprising the membrane and the membrane support-plates;

FIG. 27 is a perspective view showing another example of frame pieces for assemblage when the membrane arrangements are enclosed inside the case; and FIG. 28 is another example of the frame pieces for assemblage.

DETAILED DESCRIPTION OF THE INVENTION

The plate type fluid treatment apparatus according to this invention is of such construction as to flow dialysate in the space formed between the 1st surface of the membrane support-plate formed by embossing or press work and the membrane, and blood in the space formed between the 2nd surface of the membrane support-plate and the membrane, in order that the fluid passage may be gradually narrowed without abrupt change to cause retaining of bubbles in the fluid passage, a fatal defect which may arise in the case of thinner support-plates of 1.2mm or less in thickness. In such construction as above, retaining of bubbles has almost not been found since the fluid passages for dialysate and blood in the membrane support-plate are gradually narrowed without abrupt change even when the thickness of the membrane support-plate is less than 1.2 mm, particularly from 0.3 to 0.6 mm or even as thin as from 0. 1 to 0.2 mm. The present design is superior in the fluid channels formed by the support plates of this invention with respect to prevention of the problems associated with the apparatus disclosed in U.S. Pat. No. 3,585,131 which may utilize the same assembling method for membrane and support-plates as that of the present invention but which has a different design for blood and dialysate channels. In said apparatus, as shown in FIG. 12, the 1st membrane support plate 125 is in the pleat on one side of the folded membrane 127 and the 2nd membrane support-plate 126 in the pleat on the other side. Each support-plate is provided with inlet and outlet ports 121 and 122 communicating with the inlet and outlet nozzles for dialysate and other inlet and outlet ports 123 and 124 communicating with the inlet and outlet nozzles for blood. The dialysate passage is communcated with the inlet and outlet dialysate ports 121 and 122 of the 1st membrane support-plate 125, and with channels 130 and 134 formed on the 1st surface of said membrane support-plate. Channels 128 and 132 formed on the 2nd surface of said membrane support-plate are communicated with the slit-shaped ports 131 and 135 for distribution and collection of fluid respectively formed on said membrane support-plate. Both said channels are connected by the threshold ports 129 and 133. On the other hand, the blood passage is communicated with the inlet and outlet blood ports 123 and 124 of the 2nd membrane support-plate 126, further communicated with the channels 136 and 141 formed on the 2nd surface of said membrane support-plate, and the slit ports 139 and 143 are communicated with the channels 138 and 140 formed on the 1st surface of said membrane support-plate. Both said channels are connected by the threshold ports 137 and 141. Said 1st membrane support-plate 125 is provided with a membrane supporting region having continuous projections 144 parallel with the direction of dialysate flow and the membrane support-plate 126 is also provided with continuous projections 145 parallel with blood passage, which, however, is placed at a right angle to the dialysate flow. The enlarged plan view of the 1st membrane support-plate 125 of this construction is clearly shown in FIG. 13. For better understanding of the flow of blood and dialysate shown in FIG. 12, FIG. 14 should be referred to. Though FIG. 14 is given to show the dialysate passage, the blood passage may readily be understood from FIG. 14. The dialysate is introduced from the inlet port 21 to the channel 128 formed on the 2nd surface of the 1st support-plate 125. It then flows to the channel 130 formed on the 1st surface of said support-plate through threshold orifice 129, changing passage, to reach the slit port 131. It is then divided by the 1st and 2nd membrane supporting region of said support-plate to flow through the space 146 formed by said region and the membrane, thus exchanging substances with blood which flows the space 147 formed by the 1st and 2nd membrane supporting region of the 2nd membrane support-plate and the membrane.

In the event that the thickness of the membrane support-plate of such construction is reduced to less than 1.2 mm, the dialysate and blood to be introduced into the membrane support-plates must flow through complicated passages up to the 1st and 2nd membrane supporting regions. Widened at said slit-shaped port and therefore separated into two paths towards the 1st and 2nd surfaces of the membrane support-plate, the passage is abruptly narrowed there and bubbles contained in the fluid can not pass said slit-shaped ports, being captured easily in the slit-shaped port. As already mentioned, the captured bubbles may cause uneven flow of fluid and abnormal increase of pressure due to choking of the fluid passage. The thinner the membrane support-plate becomes, the more the bubbles are captured, leaving problems in practical use of the support-plate of the above construction. However, if the support-plate is 1.2 mm or more in thickness, larger bubbles in the fluid may easily be divided into two at the slit-shaped port, while smaller bubbles passing through the slit-shaped port cause no residence of bubbles.

Referring FIGS. 1 through 13, an example is offered for the construction of the constituting members of the Kiil type artificial kidney according to this invention.

Figure 1:
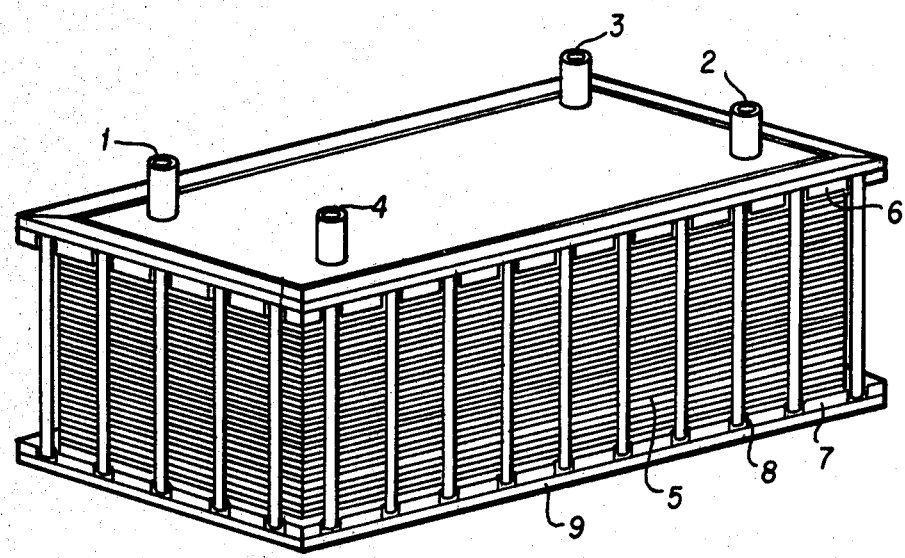
FIG. 1 is a top perspective view of the fluid treatment apparatus according to this invention.

FIG. 1 shows the apparatus according to this invention. Said apparatus consists of a plurality of stacked dialyzing members 5, the assembling pieces and a top and bottom clamping plates. Said dialyzing members 5 comprising membrane support-plates are of less than 1.2 mm in thickness and membranes inserted between said membrane support-plates are clamped by the top and bottom clamping plates 6 and 7 respectively, and fluid-tightly pressed by the ladder-shaped member 9 inserted into a plurality of cutouts 8 formed on the peripheral portion of said top and bottom clamping plates. Dialysate is introduced into the dialyzing member 5 through the dialysate inlet 1 and discharged outside through the dialysate outlet 2 after flowing through the space formed by the 1st surface of the membrane support-plate and the membrane. Blood, on the other hand, is introduced into the dialyzing member 5 through the blood inlet 3 and discharged outside through the blood outlet 4 after flowing through the space formed by the 2nd surface of the membrane support-plate and the membrane, undergoing blood purification by substance exchange between blood and dialysate through the membrane. The detailed construction of the dialyzing member 5 is shown in FIGS. 2 through 11. The construction of the assembling pieces to press and secure the dialyzing members 5 is shown in FIGS. 26 through 28. FIG. 2 is a drawing showing an example of a dialyzing member according to this invention, the membrane support-plate thereof comprising three pieces of sheets. More specifically, the dialyzing member shown in FIG. 2 is composed of the stack consisting of the membrane support-plate 30 and the membrane 17. The membrane support-plate further consists of the 1st member 15 forming the passages for blood and dialysate and the 2nd members 16 disposed on both surfaces of said 1st member, having a cutout in the region corresponding to the membrane supporting region of the 1st member which forms tunnel-shaped passages for guiding blood and dialysate to said membrane supporting region formed on the 1st and 2nd membrane support-plates. Each of the dialyzing members is provided with the manifold holes 11 and 12 communicated with dialysate inlet and outlet respectively and with the manifold holes 13 and 14 communicated with blood inlet and outlet respectively. The dialysate inlet and outlet manifold holes 11 and 12 of the 1st member 15 are provided with a plurality of channels 18 and 20 connected with the channels 19 and 21 for dialysate distribution and collection formed on the 1st surface of said member. The blood inlet and outlet manifold holes 13 and 14 of the 1st member 15 are provided with a plurality of channels 22 and 24 connected with the channels 23 and 25 for blood distribution and collection formed on the 2nd surface of said member. The 1st membrane supporting region having a plurality of projections 26 lies between said channels for distribution and collection. On the other hand, the 2nd flat membrane supporting region exists between the distribution and collection channels for blood. When the 1st member 15 is inserted between a pair of the 2nd members 16, each having a wide opening 29 in the region corresponding to the membrane supporting region of the 1st membrane support-plate, a plurality of channels 18, 20 and 22 and 24 made up on the 1st member form tunnel-shaped passages. The detailed plan view of the 1st member of such construction is clearly shown in FIG. 3. For better understanding of flow of blood and dialysate shown in FIG. 2, FIG. 4 is presented. FIG. 4(a) is a sectional view showing the dialysate passage wherein the membrane support-plate 30 consisting of the 1st member 15 interposed between a pair of the 2nd members 16, and the membrane, are stacked. The dialysate is introduced into the space 27 formed by the membrane and the 1st membrane supporting region having a plurality of protruded projections 26 through the dialysate inlet manifold hole 11, the tunnel shaped passage formed by a plurality of channels 18 on the 1st surface of the 1st surface of the 1st member 15 and the 2nd member 16, and the distribution port 19. Then, in the membrane supporting region, the dialysate exchange substances through the membrane with blood introduced into the space 28 formed by the membrane and the 2nd membrane supporting region of the 1st member 15, and is collected in the collection port 21 to be discharged from the dialysate outlet manifold hole 12 via a tunnel-shaped passage formed by a plurality of channels 22 of the 1st member 15 and the 2nd member 16. FIG. 4(b) is a drawing showing the blood passage wherein the membrane, and the membrane support-plate 30 consisting of the 1st member 15 interposed between paired 2nd members 16 are stacked. Blood is introduced from the blood inlet manifold hole 13 into the space 28 formed by the flat 2nd membrane supporting region and the membrane, through the tunnel-shaped passage formed by a plurality of channels 22 on the 2nd surface of the 1st member 15 and the 2nd member 16, and the distribution port 23. Then, the blood performs substance exchange with the dialysate through the membrane, said dialysate being introduced into the space 27 formed by the membrane and the 1st membrane supporting region of the 1st member 15 and collected in the collection port 25 to be discharged from the blood outlet manifold hole 14 via the tunnel-shaped passage formed by a plurality of channels 24 and the 2nd member 16. As apparent from the above description and FIG. 4, because dialysate and blood are guided into the distribution ports from the respective manifold holes via the tunnel-shaped passage, there is no portion where the fluid passage is abruptly narrowed and consequently bubble trapping does not occur.

In the membrane support-plates of such construction, since tight sealing at the time of pressing is difficult to obtain if the same kind of material is used for both the 1st and 2nd materials, it is preferable to use materials of two kinds differing in hardness.

FIG. 5 is a drawing showing another example of dialyzing member according to this invention where the membrane support-plate is composed of two pieces of sheets. The dialyzing member shown in FIG. 5 comprises membrane support-plate 53 and the membrane 37 in a stacked form. The membrane support-plate is further composed of the 1st member which forms channels for blood and dialysate, and the 2nd member which forms the tunnel-shaped passage to guide the dialysate into the membrane supporting region formed on the 1st surface of the 1st member and which also has an opening 54 in the region corresponding to the membrane supporting region of the 1st member being in stacked relation. Each member composing the membrane and the membrane support-plates is provided with manifold holes 31 and 32 communicated with the dialysate inlet and outlet respectively and holes 33 and 34 communicated with the blood inlet and outlet respectively. The manifold holes 31 and 32 for the dialysate inlet and outlet of the 1st member 35 are provided with a plurality of channels 38 and 40 connected to the dialysate distribution and collection ports 39 and 41 formed on the 1st surface of said member. The manifold holes 33 and 34 for the blood inlet and outlet of the 1st member are provided with a plurality of channels 42 and 46 formed on the 1st surface of the 1st member communicated with said manifolds, and a plurality of channels 44 and 48 formed on the 2nd surface of the 1st member and further communicated with the blood distribution and collection ports 45 and 49. Said plurality of channels 42 and 44 and 46 and 48 are connected with each other by the openings 43 and 47. The 1st membrane supporting region having a plurality of projections 52 lies between said dialysate distribution and collection ports. The flat 2nd membrane supporting region exists between the blood distribution and collection ports. A plurality of channels 38, 40 made up on the 1st surface of the 1st member forms tunnel-shaped passages for guiding the dialysate from the inlet and toward the outlet by disposing the 2nd member 36 having a wide opening 54 in the region corresponding to the membrane supporting region on the 1st surface of the 1st member 35. The detailed plan view of the 1st member of such construction is clearly shown in FIG. 6. For better understanding of the flow of blood and dialysate shown in FIG. 5, FIG. 7 may be referred to. FIG. 7(a) is a sectional view showing the dialysate passage, wherein the membrane support-plate 53 consists of the 1st member 35 and the 2nd member 36 disposed on the side of the 1st surface of said member, and the membranes 37 are in a stacked form. The dialysate is introduced from the dialysate inlet manifold hole 31 into the space 50 formed by the 1st membrane supporting region having protruded projections 52 and the membrane through the tunnel-shaped passage formed by a plurality of channels 38 on the 1st surface of the 1st member 35 and the 2nd member 36, and further through the distribution port 39. The dialysate, then, is guided toward the dialysate outlet manifold hole 32, performing substance exchange through the membrane with blood introduced into the space 51 formed by the 2nd membrane supporting region of the 1st member and the membrane, and is collected in the collection port 41, via the tunnel-shaped passage formed by a plurality of channels 40 of the 1st member and the 2nd member. FIG. 7(b) is a drawing showing the blood passage wherein the membrane support-plate 53 consisting of the 1st member 35 and the 2nd member disposed on the 1st surface of said member, and the membrane 37 are stacked. The blood introduced from the blood inlet manifold hole 33 into the space 51 formed by the flat 2nd membrane supporting region and the membrane, after flowing through a plurality of channels 42 formed on the 2nd surface of the said member, changes passage therefrom and through the distribution channel 45. Then, the blood is guided toward the blood outlet manifold hole 34, performing substance exchange through the membrane with the dialysate introduced into the space 50 formed by the membrane and the 1st membrane supporting region of the 1st member 35, being collected in the collection channel 48 and subsequently flowing through the threshold port 47, changing passage therefrom to a plurality of channels 46 formed on the 1st surface of said member. In this design, in order to avoid the abrupt narrowing of the passage, the depth of channels 46, 49 and 42, 44 may be made greater than one half of the thickness of the 1st member 35. FIG. 8 is a drawing showing the flow of dialysate and blood in another example of the membrane support-plate consisting of two pieces of sheets, wherein the membrane support-plates 56 consisting of the 1st member 55 and the 2nd member 36 disposed on the 2nd surface of the 1st member 55, and the membrane 37 are in a stacked form. FIG. 8(a) is a sectional view showing a dialysate passage wherein the membrane and the membrane support-plate 56 comprising the 1st member 55 and the 2nd member 36 having a wide opening in the region corresponding to the membrane supporting region of the 1st member and disposed on the 2nd surface of the 1st member 55 are in a stacked form. The dialysate is introduced from the dialysate inlet manifold hole 31 to the space 50 formed by the 1st membrane supporting region and the membrane, flowing through a plurality of channels 57 and the opening 58, changing passage therefrom to a plurality of channels 59 and through the distribution port 60. Then, the dialysate is guided toward the dialysate outlet manifold hole 32, performing substance exchange through the membrane with blood introduced into the space 51 formed by the 2nd membrane supporting region of the 1st member 51 and the membrane, and being collected in the collection port 64, flowing through a plurality of channels 63 and the opening 62, and changing passage to a plurality of channels 61 formed on the 2nd surface of said member. In this design, in order to avoid an abruptly narrowed passage, the depth of channels 57, 59 and 61, 63 may be greater than one half of the thickness of the 1st member 55. FIG. 8(b) is a drawing showing the blood passage wherein the blood is introduced from the blood inlet manifold hole 33 into the space 51 formed by the flat 2nd membrane supporting region and the membrane, flowing through the tunnel-shaped passage formed by a plurality of channels 65 on the 2nd surface of the 1st member 55 and the 2nd member 36, and further through the distribution port 66. Then, the blood is guided toward the blood outlet manifold hole 34, performing substance exchange with the dialysate introduced into the space 50 formed by the 1st membrane supporting region of the 1st member and the membrane, being collected in the collection channel 68, and flowing through the tunnel-shaped passage formed by a plurality of channels 67 of the 1st member and the 2nd member. As apparent from FIGS. 7 and 8, passages for blood and dialysate are narrowed not abruptly but gradually so as to prevent bubble capture. It is preferable to use different hardness of materials for the 1st and 2nd member of the membrane support plate having such a construction for improvement of leak-proof characteristics in the assemblage of the apparatus. FIG. 9 is still another example of the dialyzing member according to this invention wherein the membrane support-plate comprises one piece of sheet. In the dialyzing member shown in FIG. 9, the membrane 77 is interposed between the membrane support-plates wherein the 1st and 2nd membrane support-plates 75, 76 forming the blood and dialysate passages are alternately stacked. The membrane and the membrane support-plate are provided with the inlet and outlet manifold holes 71 and 72 communicated with the dialysate inlet and outlet nozzles respectively as well as the inlet and outlet manifold holes 73 and 74 communicated with the blood inlet and outlet nozzles respectively. The dialysate passages of the 1st and 2nd membrane support-plates 75, 76 are formed such that the inlet and outlet manifold holes 71, 72 are connected with a plurality of channels 78, 94 and 82, 98 formed on the 2nd surface of said membrane support-plate, and that a plurality of channels 80, 96 and 84, 100 formed on the 1st surface of said membrane support-plate are connected with the distribution and collection ports 81, 97 and 85, 101 formed on the 1st surface of said membrane support-plate, both channels further being connected with each other by the openings 79, 95, and 83, 99.

Between said dialysate distribution and collection ports provided is the 1st membrane supporting region having a plurality of protruded projections 112. The blood passage on the other hand is formed such that a plurality of channels 86, 102 and 90, 106 formed on the 1st surface of said membrane support-plate are communicated with the manifold holes 73, 74 and that a plurality of channels 88, 104 and 92, 108 formed on the 2nd surface of said membrane support-plates are communicated with the distribution and collection ports 89, 105 and 93, 109 formed on the 2nd surface of said membrane support-plate the, abovesaid channels being connected with each other by the openings 87, 103 and 91, 107. A flat 2nd membrane supporting region lies between said blood distribution and collection ports. A plurality of channels forming the winding passages at the dialysate and blood inlets and outlets of said 1st and 2nd membrane support-plates 75, 76 shall not be in alignment when stacking the 1st and 2nd membrane support-plates in order to prevent blood and dialysate from mingling. The detailed plan view of the 1st membrane support 75 of such structure as above and that of the 2nd membrane support 76 are clearly shown in FIGS. 10(a) and 10(b) respectively. For better understanding of the flow of blood and dialysate, FIG. 11 may be referred to. FIG. 11(a) is a sectional view showing the dialysate passage wherein the membrane 77 is interposed between the 1st and 2nd membrane support-plates being in a stacked form. The dialysate is introduced from the dialysate inlet manifold hole 71 to the space 110, formed by the 1st membrane supporting region having a plurality of projections 112, and the membrane, through a plurality of channels 78 communicated with said manifold hole and formed on the 2nd surface of the 1st membrane support-plate, through the opening 79, changing passage therefrom to a plurality of channels 80, and finally through the distribution port 81. Then, the dialysate is guided toward the dialysate outlet manifold hole 72 through the collection ports 85, through a plurality of channels 84 formed on the 1st surface of the 1st membrane support-plate and through the open opening 83, changing passage therefrom to a plurality of channels 82 formed on the 2nd surface of said membrane support-plate. In the meantime it performs substance exchange through the membrane with the blood introduced into the space 111 formed by the 2nd membrane supporting region of the 2nd membrane support-plate 76 and the membrane. The dialysate passage of the 2nd membrane support-plate is not shown in FIG. 11(a) as it is formed in a different position from that of the first membrane support-plate, although the passage is exactly the same as that of the 1st membrane support-plate 75. Taking such different positions of the fluid passages of the 1st and 2nd membrane support-plate is extremely important in order to prevent blood and dialysate from mingling. FIG. 11(b) on the other hand is a drawing showing the blood passage, wherein blood is guided from the blood inlet manifold hole 73 into the space 111 formed by the flat 2nd membrane supporting region and the membrane, in the course of which blood passes through a plurality of channels 86 formed on the 1st surface of the 1st membrane support-plate and the opening 87, changing passage therefrom to a plurality of channels 88 formed on the 2nd surface of said membrane support-plate to reach the distribution port 89. Then, the blood is guided toward the blood outlet manifold hole 74, collected in the collection channel 93, flows through a plurality of channels 92 formed on the 2nd surface of the 1st membrane support-plate and the opening 91 and changes passage therefrom to a plurality of channels 90 formed on the 1st surface of said membrane support-plate, the blood in the meantime exchanging substance with the dialysate introduced into the space 110 formed by the 1st membrane supporting region of the 2nd membrane support-plate 76 and the membrane. In this design, for preventing abruptly narrowed passages, the depth of channels 78, 80 and 82, 84 shown in FIG. 11(a) and of channels 86, 88 and 90, 92 in FIG. 11(b) must be greater than one half of the thickness of the 1st and 2nd members 75 and 76. Such construction can prevent retaining of bubbles in the blood and dialysate passages that are narrowed not abruptly but gradually.

Figure 3:
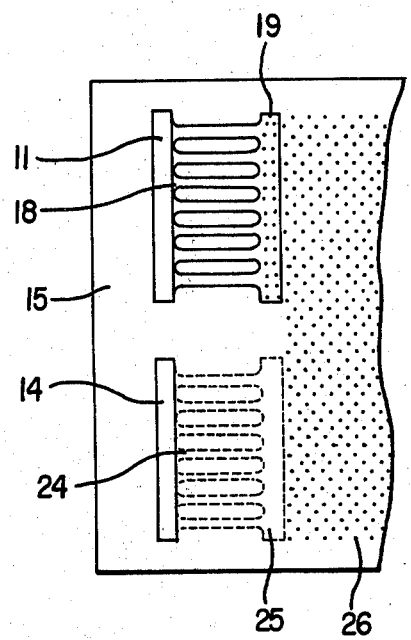
FIG. 3 is an enlarged plan view of the 1st member shown in FIG. 2.

The manifold holes of the dialysate and blood inlets and outlets shown in FIGS. 2 through 11 may be rectangular or circular, however, it will easily be understood that another appropriate shape is optionally applicable when required. The known conventional configuration of protruded projections on the surface of the 1st and 2nd membrane supporting region can be used without further modification. However, the surface in contact with blood should be flat or may be gently wavy within such an extent as to do no damage to blood. A plurality of projections are provided in the dialysate distribution and collection ports as shown in FIGS. 3, 6 and 10. When the thickness of the membrane support-plate is less than 1.2 mm and the width of the channel forming dialysate passage is more than 0.5 mm, there arises a fear that the membrane swells and hangs down into the groove when it becomes wet. Hanging down of the membrane into the channel causes such problems in a practical use as choking the passage, leading to the increase of pressure loss between the inlet and outlet of the dialyzing members. However, choking of dialysate passage due to hang-down of the membrane can be prevented by the protruding projections in the channels as above. Said projections for preventing the passage from being choked should be provided in not only the dialysate distribution and collection ports but also the channels 59, 63 of the 1st member 55 communicated with the dialysate distribution and collection ports and shown in FIG. 8(a), the channels 80, 84 of the 1st membrane support-plate 75 shown in FIG. 9, and the channels 96, 100 of the 2nd membrane support-plate 76, if the width of the channels thereof is over 0.5 mm. The membrane support-plate composing dialyzing member is therefore able to present passages narrowed not abruptly but gradually through the design according to this invention. Then the retaining of bubbles which may decrease the dialyzing performance scarcely occurs. It will be readily understood that an assembly, in which slurry fluid is introduced into the space formed by the 2nd membrane supporting region and the membrane and substance contained in said fluid is filtered through the membrane and separated into the space formed by the 1st membrane supporting region and the membrane, can be used as a filtering apparatus.

A similar construction to the membrane support-plate of the Kiil type artificial kidney according to this invention has been disclosed in FIGS. 7 through 10 in the specification of U.S. Pat. No. 3,585,131. Said membrane support-plate, in the same manner as in this invention, carries the design that dialysate flows through the 1st membrane supporting region while blood through the 2nd region. Such a construction has been adapted with the intention that two kinds of membrane support-plates, that is, the 1st membrane support-plate 125 interposed between the accordion pleat on one side and the 2nd membrane support-plate 126 between the other pleats shown in FIG. 12, are substituted by the membrane support-plate of one kind. FIG. 15 is a drawing showing in detail the dialyzing member having said membrane support-plate disclosed in FIG. 7 in the specificaton of U.S. Pat. No. 3,585,131 employed instead of the 1st and 2nd membrane support-plates 125, 126, in FIG. 12. In FIG. 12, membrane support-plates 155 of a single kind are disposed on both sides of the pleat of the folded membrane 156. The membrane support-plate is provided with the inlet and outlet ports 151, 152 communicated with the dialysate inlet and outlet nozzles respectively and the inlet and outlet ports 153 and 154 communicated with blood inlet and outlet nozzles respectively. The dialysate passages are formed by the channels 157 and 161 formed on the 2nd surface of said membrane support-plate and connected with the inlet and outlet port of the dialysate, and the channels 159 and 163 formed on the 1st surface of said membrane support-plate and communicated with the distribution and collection ports 160 and 164 formed on the 1st surface of said membrane support-plate, and by the openings 158 and 162 which connect said channels with each other. The blood passages on the other hand are formed by the channels 165, 169 formed on the 1st surface of said membrane support-plate and connected with the blood inlet and outlet ports 153 and 154 of said membrane support-plate and the channels 167 and 171 formed on the 2nd surface of said membrane support-plate and communicated with the distribution and collection ports 168 and 172 formed on the 2nd surface of said membrane support-plate, and by the openings 166 and 170 which connect said channels with each other. The detailed plan view showing such membrane support-plate 155 is clearly shown in FIG. 16. For a better understanding of the flow of dialysate and blood, FIG. 17 may be referred to. FIG. 17 is a drawing showing the flow of dialysate; however, the flow of blood also will be easily understood by referring to FIG. 17. Dialysate is introduced from the inlet port 151 and flows through the channel 157 formed on the 2nd surface of the membrane support-plate 155 and the opening 158, and after changing passage therefrom to the channel 159 formed on the 1st surface of said membrane support-plate and after being guided into the dialysate distribution channel 160 formed on the 1st surface of the membrane support-plate, it performs substance exchange with blood flowing through a space 175 formed by the 1st membrane supporting region of said membrane support-plate and the membrane. The membrane support-plate of such construction with no abruptly narrowed portion in the fluid passage may prevent the retaining of bubbles. However, mingling of blood and dialysate is generated because said support-plate has no sealed portion separating blood from dialysate, as shown in A of FIG. 18. Therefore, this construction is considered impossible to implement for practical use.

A dialyzing member according to this invention is the 1st disclosure of the specific construction in order to present mingling of blood and dialysate as shown in FIG. 18. Particularly, the use of the membrane support-plate as shown in FIGS. 2 and 5 facilitates the construction of a dialyzing member composed of a single kind of membrane support-plate as suggested in U.S. Pat. No. 3,585,131.

In order to reduce the thickness of the above said membrane support-plate to 1.2 mm or less, it is important to make the base sheet of the membrane support-plate thin, although it is difficult to do so even by embossing or press work, particularly in the case of a base sheet thinner than 500$\mu$. This difficulty results from poor molding and/or insufficient separation from the mold in the operation of embossing or press work. In other words, a plurality of projections forming the membrane supporting region bites into the mold and becomes difficult to separate therefrom. Although the same phenomenon occurs when the base sheet of the membrane support is thick, it is not then difficult to produce the membrane support-plate because forceful pulling of product from the mold is possible even when the product bites. On the contrary, when a base sheet becomes less than 500$\mu$, particularly less than 300$\mu$, it is extremely difficult to separate a product from the mold, without it being torn, stretched, or taken out leaving projections behind in the mold, or without thereby having holes in the base sheet. As a result of assiduous study with trial manufacture of various types of molds for membrane support-plates, the present inventors have found a very important relationship between unmoldability of the product and the thickness d of the base plate, height of projection, density in arrangement of projections, etc. In a further experimental study on this point, they made a metallic mold for a press as shown in FIG. 19 to examine unmoldability of product 182 from the mold 181 in the following steps:

In FIG. 19, parallel channels at the interval of 500$\mu$ were engraved on a template of copper plate of 1000$\mu$ in thickness by means of an engraving drill with a tip angle of 30° and tip roundness of 15$\mu$ in. radius. Ten types of said parallel channels ranging from 20$\mu$ to 1000$\mu$ in depth were engraved, where each was different in thickness by 20$\mu$. The length of said parallel channels is 50 mm. Using this template, press work was performed on a sheet of high density polyethylene. Different types of products in the thickness d of base sheet 185 were obtained using said sheets having different thickness. When the sheet of thickness as desired was not available, a plurality of thin sheets was appropriately layered to satisfy the purpose. As bubble removal was required for press molding such sheets, the product was carefully hot-pressed and transferred from the hot-press apparatus to the cold press apparatus for cooling. After examining sid product by magnifying it, leaving said product in the mold, and ascertaining no bubbles, the mold was placed on the table 184 horizontally, the reverse side of the mold was fixed, and the product 182 was peeled off along the height of projections from the projections 180 to the taller ones. Unmoldability of the mold was expressed in terms of the height of projections at which an abnormality in unmolding such as tearing, substantial stretch, or genertion of a hole develops. The result of the unmoldability test thus carried out is shown in FIG. 20. The abscissa of the diagram stands for the thickness of the base sheet d, while ordinate for the sum V of the volumes of all projections on said base sheet divided by the areas of the base sheet, S, i.e., mean height, V/S, of projections. The larger the mean height V/S is, the more difficult the unmolding becomes in the base sheet having a certain thickness. So, it is apparent from FIG. 20 that the membrane support-plate can not easily be made in the region above the plotted lines an unmolding then becomes difficult. In the drawing, straight lines 186 denotes V/S=d; 187 denoting V/S=(3/5)d; 188 denoting V/S=($\frac{1}{3}$)d.

An understood from the drawing, when the thickness, d, of the base sheet is under 300μ, almost all plots are included in the region under the straight line V/S=d. Therefore, it is shown that the membrane cannot easily be made in the region above the line V/S=d. Further, since unmoldability of the product becomes better with the decrease of mean height V/S for a fixed thickness, d, of the base sheet, V/S≦(3/5)d is preferrable, V/S≦($\frac{1}{3}$)d being more preferrable. In this test, though a membrane support-plate of at least 30μ in thickness for the base sheet could be obtained using polyethylene as a material, it will be understood that the use of stronger materials, for example, cellulose triacetate or polyester, permits the manufacture of the membrane support-plate of even thinner base sheet, for example, 5μ in thickness. When viewed from the manufacture of such a membrane support-plate and prevention of uneven flow, intermittent projections are preferable instead of continuous ones so far as the height of the projections are the same, and a shape minimizing the volume of projection such as a conical one is desirable. An example of such a shape of projections is shown in FIGS. 21 through 24. FIG. 21 is a view of intermittent rib projections 190 formed on the base sheet 189, FIG. 22 being a view of projections 191 in the shape of a circular truncated cone, FIG. 23 being a view of projection 192 in the shape of a frustum of a pyramid, and FIG. 24 being a view of projections 193 in the shape of spherical segment. The above said projections may be provided on the 1st and 2nd membrane supporting regions of the membrane support-plates; however, on the 2nd membrane supporting region which is in direct contact with blood, the shape of projections must be so designed as to give no damage to blood. For a membrane support-plate, a sheet or the like which is generally used and made of synthetic polymer, rubber, metal, plastics blended with active carbon on the surface, and plastics containing a chemical base which acts with enzyme and is fixed can be used. Particularly, moldable plastics such as polyethylene, polypropylene, cellulose triacetate, polycarbonate, or polyester are suitable for a membrane support-plate. Especially, in a membrane support-plate fixed with adsorbent on the 2nd membrane supporting region on the side of blood in which blood is in direct contact with the adsorbent fixed on the membrane support-plate, all of the unnecessary substances in the blood are adsorbed and removed by said adsorbent and the remainder which is not adsorbed and urea which is said to be unremovable by adsorption as well as excessive water are to be removed through the membrane. There is provided an advantage, therefore, that an artificial kidney using only the membrane can be made further more compact.

The adsorbent fixed onto the above said membrane support-plate is preferably active carbon, silica-alumina, or ion exchange resin and the like. Among them, active carbon is considered suitable in view of the adsorbing capability thereof. With respect to the shape of adsorbent, as this agent is in direct contact with blood, it is preferably in the round shape having neither corner nor edge, such as bead-like active carbon. For increasing the surface area of the grain per unit weight as far as possible, the diameter of the grain is preferably small and if active carbon is used, it is, most preferably in the shape of powder or fiber.

As a simple method for fixing said adsorbent on said membrane support-plate, the adsorbent may be simply adhered on the membrane support-plate with known adhesives such as silicone or polyurethene. Besides the membrane support-plate with an adsorbent layer on the surface, the support-plate itself may be molded only with an adsorbent layer insofar as said adsorbent layer is provided with mechanical strenth necessary as a membrane support-plate and the one fluid such as blood in this case does not go through the adsorbent layer to mingle with the other, the dialysate.

As said adsorbent is in contact with blood, it is desirable to encapsulate said adsorbent with those substances which possess excellent affinity with blood such as cellulosic or hydrophilic (meth)-acrylate polymers.

FIG. 25 is a drawing showing an example of a membrane support-plate with such an adsorbent layer wherein the layer 195 of adsorbent is fixed in the 2nd membrane supporting region of the 2nd surface of the membrane support-plate 194.

The membrane to be used in this invention includes one capable of applying any action to fluid, such as regenerated cellulosic, polyvinyl alcoholic, polycarbonate, polyacrylonitrile as a dialyzing membrane; polyvinyl alcoholic or acetate as an ultrafiltration membrane; silicone rubber, polyethylene, or polyvinyl alcoholic as a permeable membrane; other porous membranes for filtration are nonwoven film and those enzymes adsorbent therewith. The above said dialyzing membrane and the one containing the adsorbent such as active carbon are generally said to be suitable for an artificial kidney.

FIG. 26 through 28 are views showing parts for assembing membrane arrangements according to this invention. In FIG. 26, said ladder-shaped members 204 are inserted into the cutouts 205 around the periphery of the top and bottom clamping plates from the sides of said membrane arrangements 201 after said membrane arrangements are placed between the top clamping plate 202 and the bottom one 203 and compressed fluidtightly.

Although the cutouts for inserting the ladder-shaped members are not provided on the membrane arrangements in FIG. 26, they are for prevention of leakage of fluid and cutouts may be preferably provided for the membrane arrangements as well.

The numeral 206 in FIG. 26 indicates the inlet of dialysate, and 207, the outlet of blood. Such means for securing membrane arrangements in simple in assembling operation and speedy as so-called [one-touch], which is advantageous for automatic assembling. As another example, it is also feasible, as shown in FIG. 28, to provide cutouts 209 on the flange part 208 of a box-like case for inserting the ladder-like members 210 therebetween or to provide a flat plate 211 on one side of the ladder-like member.

Now, a description will be made of a plate type fluid treatment apparatus as an embodiment of this invention as follows. An apparatus of such construction as shown in FIGS. 2 through 4 was fabricated in the following steps. The 1st member 15 of 400$\mu$ in thickness as shown in FIG. 2 was made by applying press work on the polypropylene film sold in the market. The conical projections in an arrangement of a bias grid forming the first membrane supporting region were obtained in the height of b 300$\mu$, when the thickness of the base sheet was 100$\mu$. On the other hand, the 2nd member 16 was made of polyethylene film of 200$\mu$ in thickness. The thickness of the membrane support-plate, then, became 800$\mu$. The size of the membrane was 100×250 mm, the membrane supporting region being 80×200 mm. The mean height V/S of the projections in said region was about 55$\mu$, roughly one half of the thickness of the base sheet. By stacking such membrane support-plate in 63 layers alternately with cuprammonium cellulose membrane of 10$\mu$ thick inserted between said membrane support-plates, a stack of the dialyzing members was obtained. Said dialyzing members were inserted between the top and bottom clamping plates 5 mm thick made of polycarbonate and pressed. The ladder-like members were inserted into the cutouts of said clamping plates. In this way, a compact and light weight artificial kidney, 100×250×60 mm in size, 1 kg in weight, was obtained.

For a plate type fluid treatment apparatus according to this invention, an integrated member of the membrane support-plates and the membranes can be obtained by the following process. First, produce the 1st member of the membrane support-plates by continuous formation of membrane supporting regions, and channels by embossing or press work onto continuous sheet-like film; then, apply an adhesive continously to the continuous sheet-like membrane support-plate thus obtained excluding the membrane supporting region of the 1st surface of said membrane support-plate; fix the continuous dialyzing membranes onto the membrane support-plates; perforate holes to communicate the membrane support-plates with a fluid inlet and outlet; and cut said continuous dialyzing members in a predetermined length. A plate type fluid treatment apparatus is completed by stacking said members in number as required, inserting said members between the top and bottom clamping plates with subsequent compression thereon by the press machine and inserting ladder-shaped members into the cutouts of the clamping plates.

As understood from the above description, this invention facilitates an automated manufacture of an artificial kidney, which has been difficult in the conventional kiil type artificial kidney and therefore can provide an inexpensive Kiil type artificial kidney.

An embodiment of this invention has been described as above referring to drawings and it is to be understood to those skilled in the art that it is apparent that various modifications are possible without departing from the spirit of this invention.

We claim:

1. A plate type fluid treatment apparatus comprising:
a plurality of stacked membrane support plates having a thickness not greater than 1.2 mm, each said membrane support plate having a face side and a reverse side, said plates being stacked in a stacking direction such that each of said face side of one of said plates faces the reverse side of an adjacent plate and each said reverse side faces the face side of an adjacent plate;
a single membrane interposed between each of said plates;
a first membrane supporting zone on a central portion of each said face side;
a second membrane supporting zone having a configuration different from that of said first membrane supporting zone on a central portion of each said reverse side;
first through fourth fluid manifold holes on the peripheral portions of each of said plates, said fluid manifold holes being aligned so as to form a manifold in said stacking direction;
inlet and outlet ports for each of said first and second fluids, said inlet and outlet ports respectively communicating with said fluid manifold holes on the peripheral portions of said plates;
first fluid introducing means in each said plate for introducing said first fluid from said first fluid manifold hole into the space between said first membrane supporting zone of each said plate and one of said membranes; and
second fluid introducing means in each said plate for introducing said second fluid from said second fluid manifold hole into the space between said second membrane supporting zone of each said plate and another of said membranes;
wherein said separate first and second fluid introducing means in each said plate prevent mingling of said fluids;
wherein each of said membrane support plates has a thickness at said membrane supporting zones of $d=5$ to 500$\mu$, each first membrane supporting zone having a large plurality of projections thereon wherein d at least equals or is greater than the total volume of said projections divided by the area of said first membrane supporting zone, and each of said second membrane supporting zones being substantially flat; and
wherein each said membrane support plate comprises
a first member including said first and second membrane supporting zones, said manifold holes and fluid introducing means connecting said first and second membrane supporting zones with said first and second manifold holes; and
a second member on either side of said first member, each said second member including said manifold holes and an opening in a zone corresponding to said membrane supporting zones;
wherein said first and second members are located adjacent one another so that each of said fluid introducing means, together with a portion of said second member, form a tunnel-like fluid flow introduction path.

2. A plate type fluid treatment apparatus comprising:
a plurality of stacked membrane support plates having a thickness not greater than 1.2 mm, each said membrane support plate having a face side and a reverse side, said plates being stacked in a stacking direction such that each of said face sides of one of said plates faces the reverse side of an adjacent plate and each said reverse side faces the face side of an adjacent plate;

a single membrane interposed between each of said plates;

a first membrane supporting zone on a central portion of each said face side;

a second membrane supporting zone having a configuration different from that of said first membrane supporting zone on a central portion of each said reverse side;

first through fourth fluid manifold holes on the peripheral portions of each of said plates, said fluid manifold holes being aligned so as to form a manifold in said stacking direction;

inlet and outlet ports for each of said first and second fluids, said inlet and outlet ports respectively communicating with said fluid manifold holes on the peripheral portions of said plates;

first fluid introducing means in each said plate for introducing said first fluid from said first fluid manifold hole into the space between said first membrane supporting zone of each said plate and one of said membranes; and second fluid introducing means in each said plate for introducing said second fluid from said second fluid manifold hole into the space between said second membrane supporting zone of each of said plate and another of said membranes;

wherein said separate first and second fluid introducing means in each said plate prevent mingling of said fluids;

wherein each of said membrane support plates has a thickness at said membrane supporting zones of $d = 5$ to $500\mu$, each said first membrane supporting zone having a large plurality of projections thereon wherein d at least equals or is greater than the total volume of said projections divided by the area of said first membrane supporting zone, and each of said second membrane supporting zones being substantially flat; and wherein:

said first fluid introducing means including an opening which connects a channel communicating with the first fluid manifold hole formed on said reverse side of said support plate to another channel formed on the face side of the support-plate connected with the first membrane supporting zone;

said second fluid introducing means including an opening which connects a channel communicating with the second fluid manifold hole formed on said face side of the support-plate to another channel formed on the reverse side of the support-plate connected with the second membrane supporting zone; and said first and second fluid introducing means on each plate being arranged so that each of said fluid introducing means is out of alignment with the corresponding fluid introducing means on the adjacent plate.

3. The plate type fluid treatment apparatus of claim 1 or 2 wherein each of said projections is in the shape of a cone.

4. The plate type fluid treatment apparatus of claim 3 wherein each said plate is rectangular and said first and second fluid manifold holes are provided on the short sides of said rectangular plate symmetrically with respect to the center of said plate.

5. The plate type fluid treatment apparatus of claim 4 wherein said membrane is a permeable membrane made from one of the groups consisting of regenerated cellulose, polyvinyl alcohol, polycarbonate, and polyacrylonitrile.

6. The plate type fluid treatment apparatus of claim 5 wherein said first fluid is dialysate and said second fluid is blood.

7. The plate type fluid treatment apparatus of claim 6 wherein a plurality of stacked membrane support-plates and membranes interposed between said plates are clamped by top and bottom clamping plates and fixed in compressed state fluid-tightly by ladder-shaped members inserted into a plurality of cutouts formed on the periphery of said clamping plates.

8. The plate type fluid treatment apparatus of claim 1 or 2 wherein an adsorbent is fixed onto the substantially flat second membrane supporting zone.

9. The plate type fluid treatment apparatus of claim 1 or 2 wherein said membrane support-plate is made by one from the means of embossing and press work.

* * * * *